United States Patent
Long et al.

(10) Patent No.: US 11,921,276 B2
(45) Date of Patent: Mar. 5, 2024

(54) METHOD AND APPARATUS FOR EVALUATING IMAGE RELATIVE DEFINITION, DEVICE AND MEDIUM

(71) Applicant: BEIJING BAIDU NETCOM SCIENCE AND TECHNOLOGY CO., LTD., Beijing (CN)

(72) Inventors: Xiang Long, Beijing (CN); Yan Peng, Beijing (CN); Shufei Lin, Beijing (CN); Ying Xin, Beijing (CN); Bin Zhang, Beijing (CN); Pengcheng Yuan, Beijing (CN); Xiaodi Wang, Beijing (CN); Yuan Feng, Beijing (CN); Shumin Han, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 374 days.

(21) Appl. No.: 17/379,428

(22) Filed: Jul. 19, 2021

(65) Prior Publication Data

US 2021/0350173 A1    Nov. 11, 2021

(30) Foreign Application Priority Data

Oct. 23, 2020 (CN) .......................... 202011146679.7

(51) Int. Cl.
*G02B 21/24* (2006.01)
*G02B 21/36* (2006.01)
(Continued)

(52) U.S. Cl.
CPC ......... *G02B 21/244* (2013.01); *G02B 21/367* (2013.01); *G06F 18/213* (2023.01); *G06F 18/214* (2023.01)

(58) Field of Classification Search
CPC ................ G02B 21/008; G02B 21/244; G02B 21/361–367; G06F 18/21; G06F 18/213–214
See application file for complete search history.

(56) References Cited

U.S. PATENT DOCUMENTS

2008/0137938 A1   6/2008  Zahniser
2008/0266440 A1   10/2008 Yazdanfar et al.
2022/0120664 A1*  4/2022  Rognin .............. G01N 15/1434

FOREIGN PATENT DOCUMENTS

CN           109522960 A         3/2019

OTHER PUBLICATIONS

Yin et al, "Feature Pyramid Networks for Object Detection" (published at https://arxiv.org/abs/1612.03144, Apr. 2017).*

(Continued)

*Primary Examiner* — Casey L Kretzer
(74) *Attorney, Agent, or Firm* — KDW Firm PLLC (57) ABSTRACT

Provided are a method and apparatus for evaluating image relative definition, a device and a medium, relating to technologies such as computer vision, deep learning and intelligent medical. A specific implementation solution is: extracting a multi-scale feature of each image in an image set, where the multi-scale feature is used for representing definition features of objects having different sizes in an image; and scoring relative definition of each image in the image set according to the multi-scale feature by using a relative definition scoring model pre-trained, where the purpose for training the relative definition scoring model is to learn a feature related to image definition in the multi-scale feature.

16 Claims, 3 Drawing Sheets

---

S201: Extract a multi-scale feature of each image in an image set by using a pyramid Laplace operator, where the pyramid Laplace operator is used for respectively extracting features by using the Laplace operator at multiple image scales and merging the extracted features S202: Score relative definition of each image in the image set according to the multi-scale feature by using a relative definition scoring model pre-trained S203: Perform definition sequencing on images in the image set based on scoring results (51) Int. Cl.
*G06F 18/213* (2023.01)
*G06F 18/214* (2023.01)

(56) References Cited

OTHER PUBLICATIONS

Guo et al, "A Fast Method for Image Matching and Registration Based on SIFT Algorithm and Image Pyramid" (published at Journal of Physics: Conference Series, vol. 1449, 2019 2nd International Symposium on Power Electronics and Control Engineering, Nov. 2019).*
Zhang et al, "Multi-resolution attention convolutional neural network for crowd counting" (published in Neurocomputing vol. 329, pp. 144-152, Feb. 2019).*
Koho et al., "Image Quality Ranking Method for Microscopy" Scientific Reports, vol. 6, No. 1, Jul. 27, 2016.
Yazdanfar et al., "Simple and robust image-based autofocusing for digital microscopy", Optics Express, vol. 16, No. 12, Jun. 9, 2008.
European Search Report and Written Opinion for the European Patent Application No. EP21187072, dated Jan. 14, 2022, 8 pages.

* cited by examiner

METHOD AND APPARATUS FOR EVALUATING IMAGE RELATIVE DEFINITION, DEVICE AND MEDIUM

CROSS-REFERENCE TO RELATED APPLICATION

This application claims priority to Chinese Patent Application No. 202011146679.7 filed Oct. 23, 2020, the disclosure of which is incorporated herein by reference in its entirety.

TECHNICAL FIELD

The present disclosure relates to the field of artificial intelligence, in particular, to technologies of computer vision, deep learning and intelligent medical and, more particularly, to a method and apparatus for evaluating image relative definition, a device and a medium.

BACKGROUND

Microscopic images are very sensitive to capturing focal lengths. Slight changes in focal length bring great changes in definition. Different focal lengths need to be selected for different captured objects and different slides to capture the clearest images. Therefore, an essential step in the preprocessing of intelligent medical diagnosis data based on microscopic images is to determine a relative sequence of microscopic image definition at various focal lengths. Only by determining the relative sequence of microscopic image definition at various focal lengths can one or more microscopic images be effectively selected for subsequent analysis.

Therefore, given an image group captured at different focal lengths in the same field of view, how to accurately obtain a relative definition relationship of this image group has become an urgent problem to be solved at present.

SUMMARY

The present disclosure provides a method and apparatus for evaluating image relative definition, a device and a medium to improve the evaluation accuracy for image relative definition.

In a first aspect, the present disclosure provides a method for evaluating image relative definition. The method includes the steps described below.

A multi-scale feature of each image in an image set is extracted. The multi-scale feature is used for representing definition features of objects having different sizes in an image.

Relative definition of each image in the image set is scored according to the multi-scale feature by using a relative definition scoring model pre-trained.

The purpose for training the relative definition scoring module is to learn a feature related to image definition in the multi-scale feature.

In a second aspect, the present disclosure further provides an apparatus for evaluating image relative definition. The apparatus includes a multi-scale feature extraction module and a relative definition scoring module.

The multi-scale feature extraction module is configured to extract a multi-scale feature of each image in an image set. The multi-scale feature is used for representing definition features of objects having different sizes in the image.

The relative definition scoring module is configured to score relative definition of each image in the image set according to the multi-scale feature by using a relative definition scoring model pre-trained.

The purpose for training the relative definition scoring module is to learn a feature related to image definition in the multi-scale feature.

In a third aspect, the present disclosure further provides an electronic device. The electronic device includes at least one processor and a memory.

The memory is communicatively connected to the at least one processor.

The memory stores instructions executable by the at least one processor. The instructions are executed by the at least one processor to enable the at least one processor to execute the method for evaluating image relative definition of any embodiment of the present disclosure.

In a fourth aspect, the present disclosure further provides a non-transitory computer-readable storage medium storing computer instructions. The computer instructions are configured to cause a computer to execute the method for evaluating image relative definition of any embodiment of the present disclosure.

BRIEF DESCRIPTION OF DRAWINGS

The drawings are intended to provide a better understanding of the present solutions and not to limit the present disclosure. In the drawings.

DETAILED DESCRIPTION

Exemplary embodiments of the present disclosure, including various details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
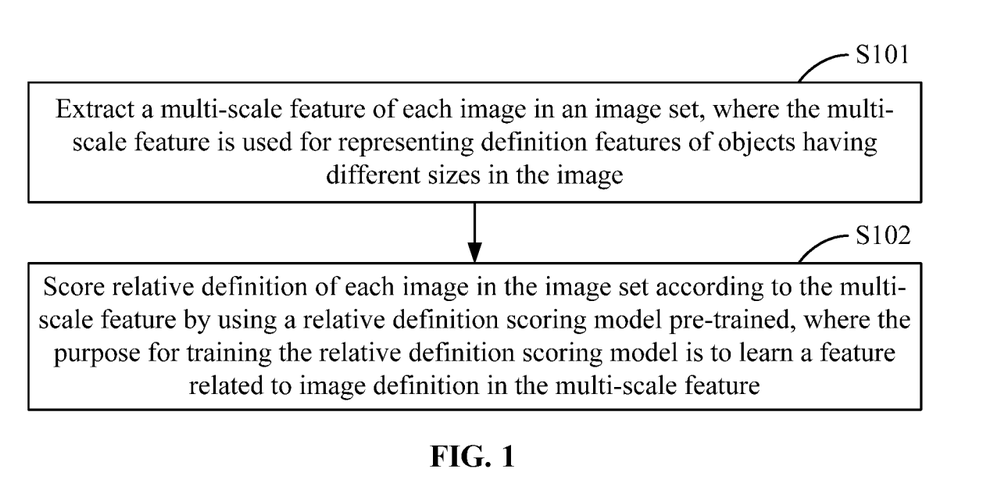
FIG. 1 is a flowchart of a method for evaluating image relative definition according to an embodiment of the present disclosure.

FIG. 1 is a flowchart of a method for evaluating image relative definition according to an embodiment of the present disclosure. This embodiment is applicable to the case of scoring relative definition of each image in an image set, for example, scoring relative definition of microscopic images captured at different focal lengths in the same field of view, which relates to technologies such as computer vision, deep learning and intelligent medical. The method may be executed by an apparatus for evaluating image relative definition. The apparatus is implemented in software and/or hardware, and is exemplarily configured in an electronic device, such as a server or a computer device. As shown in FIG. 1, the method specifically includes the steps described below.

In step S101, a multi-scale feature of each image in an image set is extracted. The multi-scale feature is used for representing definition features of objects having different sizes in the image.

Specifically, using a microscopic image as an example, since microscopic images are very sensitive to capturing focal lengths, definition changes greatly in microscopic images captured at different focal lengths in the same field of view. Specifically, captured subjects of the microscopic image are usually very tiny objects such as cells, and the captured subjects are usually placed between a slide and a coverslip. Considering that the captured subjects have different thicknesses and there are dust and other attachments on the coverslip and the slide, clear images may be captured at multiple different focal lengths even in the same field of views. For example, when focusing is performed on the upper surface of the coverslip, dust attached to the upper surface may be clearly captured, and the image is clear in view of ordinary definition; however, a current captured subject is not the dust, but cells located between the slide and the coverslip, so the image is not clear in view of the captured subject (i.e., cells).

Based on this, according to embodiments of the present disclosure, a multi-scale feature of each image in an image set is extracted. The multi-scale feature is used for representing definition features of objects having different sizes in an image. In other words, features of the objects having various sizes in the image, including both cells and dust, may be extracted to prepare data for distinguishing definition of objects having different sizes.

In step S102, relative definition of each image in the image set is scored according to the multi-scale feature by using a relative definition scoring model pre-trained.

The purpose for training the relative definition scoring module is to learn a feature related to image definition in the multi-scale feature. In other words, through the model training, the model can have the ability to identify a feature related to image definition from a multi-scale feature. For example, for microscopic images, when images in an image set include both an image in which dust is clear and an image in which a captured subject (i.e., cells) is clear, since the cells are the captured subject, a feature of the cells is the feature related to image definition. Thus, the trained relative definition scoring model can identify the feature of the captured subject (i.e., cells) from a multi-scale feature of an image.

When the model has the ability to distinguish definition features of a captured subject and a non-captured subject, more consideration can be given to the definition feature of the captured subject when the relative definition of each image is scored according to the multi-scale feature.

In an exemplary implementation, the above may be achieved in the following manner: a weight of a feature extraction network part related to image definition is increased in the model during the training process. For example, through model training, a weight of a feature extraction network part of the captured subject related to image definition is continuously updated and optimized in the network during the process of updating and optimizing network parameters. In this way, after the model is trained, in the extracted multi-scale feature, a feature part of the captured subject related to image definition has a higher weight than feature parts of other objects in the image, so that in the subsequent scoring, a higher score is inclined to be given to the image in which the captured subject is clear, thus avoiding the case where an image in which a non-captured subject such as dust is clear is used as a final clear image.

According to the technical solution of this embodiment of the present disclosure, definition features of objects having different sizes in an image are effectively distinguished by extracting a multi-scale feature, a model learns a feature related to image definition in a multi-scale feature through training, and then, relative definition is scored by using the trained model. This can improve the evaluation accuracy for image relative definition and reduce the misjudgment of using an image in which a non-captured subject is clear as a final clear image.

Figure 2:
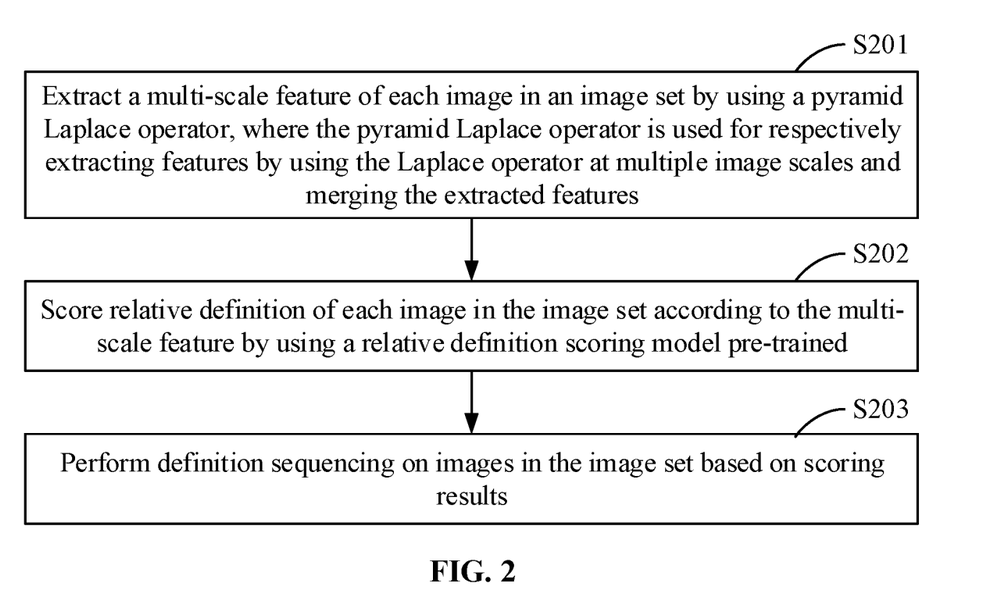
FIG. 2 is a flowchart of a method for evaluating image relative definition according to an embodiment of the present disclosure.

FIG. 2 is a flowchart of a method for evaluating image relative definition according to an embodiment of the present disclosure. This embodiment is further optimized based on the preceding embodiment. As shown in FIG. 2, the method specifically includes the steps described below.

In step S201, a multi-scale feature of each image in an image set is extracted by using a pyramid Laplace operator. The pyramid Laplace operator is used for respectively extracting features by using the Laplace operator at multiple image scales and merging the extracted features.

A Laplace operator for an image is a second-order differential operator in 2-dimensional Euclidean space. An operation template may be used in a specific implementation. If the Laplace operator is a Laplace operator with 4 neighborhoods, the operation template may be expressed as:

| 0 | 1  | 0 |
|---|----|---|
| 1 | −4 | 1 |
| 0 | 1  | 0 |

Then, an ordinary Laplace operator may be written as the following formula:

$$y[i,j]=-4\cdot x[i,j]+x[i-1,j]+x[i,j-1]+x[i+1,j]+x[i,j+1]$$

x[i, j] denotes a pixel in the i-th row and the j-th column of an image. y[i, j] denotes a Laplace score of the pixel in the i-th row and the j-th column of the image. The variance of Laplace scores of all pixels in the image is a final Laplace score of the image.

To obtain definition of a multi-scale subject, in this embodiment of the present disclosure, the multi-scale feature of each image is extracted by using the pyramid Laplace operator. The pyramid Laplace operator is used for extracting the features by using the Laplace operator at various image scales and merging the extracted features.

Assuming that k denotes a scale, the pyramid Laplace operator may be written as the following formula:

$$y_k[i,j]=-4\cdot x[i,j]+x[i-k,j]+x[i,j-k]+x[i+k,j]+x[i,j+k]$$

$f_k$ denotes the variance of $y_k$[i, j]. A series of Laplace scores can be obtained by changing the value of k. For example, if k=1, 2, 4 and 8, four Laplace scores $f_1$, $f_2$, $f_4$ and $f_8$ can be obtained. After the four Laplace scores are merged, the multi-scale feature of the image can be obtained. Usually, the multi-scale feature after the merging is a 4-dimensional feature vector, and each dimension in the vector is a Laplace score at a certain scale.

Further, in another implementation, to obtain richer multi-scale information, the multi-scale feature may be obtained by scaling an image. Specifically, the step in which the multi-scale feature of each image in the image set is extracted by using the pyramid Laplace operator includes the steps described below.

Each image in the image set is scaled according to at least two multiple values to obtain at least two scaled images corresponding to each image.

A multi-scale feature of each scaled image is extracted by using the pyramid Laplace operator.

Multi-scale features of the at least two scaled images corresponding to each image are merged to obtain the multi-scale feature of each image.

For example, the image is scaled down by 1 time (that is, the original image), 2 times, 4 times and 8 times separately to obtain four scaled images; then, a multi-scale feature of each scaled image is extracted according to the preceding method by using the pyramid Laplace operator, that is, a 4-dimensional feature vector of each scaled image can be obtained as the multi-scale feature of the each scaled image; finally, the 4-dimensional feature vectors of the four scaled images of each image in the image set are merged to obtain the multi-scale feature of the each image, that is, a 16-dimensional feature vector.

It is still to be noted that embodiments of the present disclosure do not make any limitation to the scale k and the multiple values of the scaled image mentioned above, and any scale k and any multiple value may be selected according as required in actual scenarios. Moreover, embodiments of the present disclosure are not limited to extracting an image feature by using a Laplace operator, and other extraction methods for an image feature may be selected, as long as the multi-scale feature of the image is extracted by adjusting the scale or scaling the image.

In step S202, relative definition of each image in the image set is scored according to the multi-scale feature by using a relative definition scoring model pre-trained.

The purpose for training the relative definition scoring module is to learn a feature related to image definition in the multi-scale feature. The multi-scale feature of the image can represent features of objects having different sizes in the image, for example, represent features of cells and dust in a microscopic image, and the model can determine the feature related to image definition in the multi-scale feature through learning. That is, still using the microscopic image as an example, the model has the ability to determine a feature of cells in the multi-scale feature. Thus, with such model, a higher relative definition score can be predicted for an image in which cells are clear, thus avoiding the case where an image in which dust is clear is used as an image having high relative definition.

In step S203, definition sequencing is performed on images in the image set based on scoring results.

For example, the sequencing is performed according to the magnitude sequence of scoring results, and one or more images having higher relative definition scores may be used as clear images for subsequent further analysis.

According to the technical solution of this embodiment of the present disclosure, definition features of objects having different sizes in an image are effectively distinguished by extracting a multi-scale feature by using a pyramid Laplace operator, a model learns a feature related to image definition in a multi-scale feature through training, and then, relative definition is scored by using the trained model. This can improve the evaluation accuracy for image relative definition.

Figure 3:
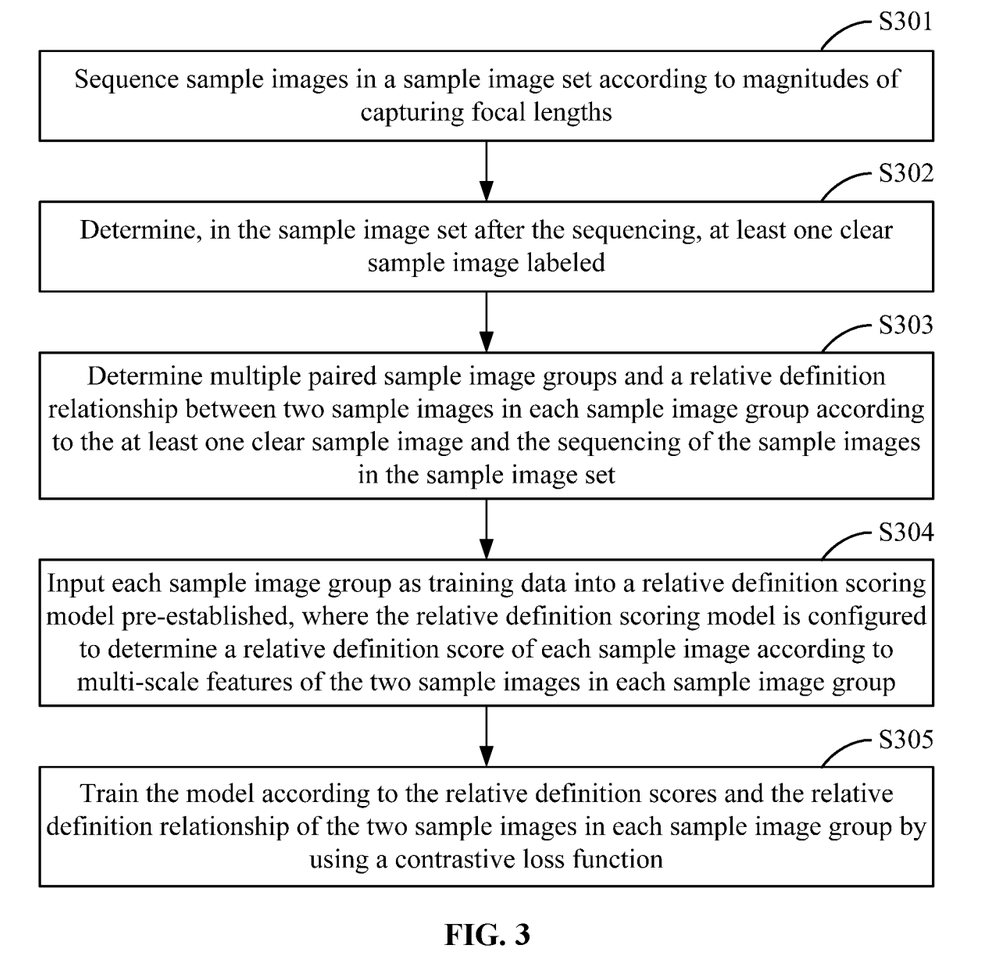
FIG. 3 is a flowchart of a process for training a relative definition scoring model according to an embodiment of the present disclosure.

FIG. 3 is a flowchart of a method for evaluating image relative definition according to an embodiment of the present disclosure. This embodiment is further optimized based on the preceding embodiment. As shown in FIG. 3, the process for training a model specifically includes the steps described below.

In step S301, sample images in a sample image set are sequenced according to the magnitudes of capturing focal lengths.

For example, the sample images in the sample image set may be microscopic images captured by a capturing device at different focal lengths in the same field of view. During the training, multiple such sample image sets may be selected to achieve more sufficient model training.

In step S302, at least one clear sample image labeled is determined from the sample image set after the sequencing.

In step S303, multiple paired sample image groups and a relative definition relationship between two sample images in each sample image group are determined according to the at least one clear sample image and the sequencing of the sample images in the sample image set.

Specifically, using a microscopic image as an example, after the sample images are sequenced from left to right according to the sequence of focal lengths from small to large, the images must go from blurred to clear and then to blurred. Thus, after one or more clearest images are labeled, it can be determined that on the left of the labeled clear image(s), the further to the left, the lower the definition, and similarly, on the right of the labeled clear image(s), the further to the right, the lower the definition. In this way, the multiple paired sample image groups can be directly determined from the sample images, and the definition relative relationship between the two sample images in each sample image group can further be determined.

Therefore, in this embodiment of the present disclosure, only at least one clear image, rather than each sample pair, in the sample image set captured at different focal lengths in the same field of view needs to be labeled, thereby reducing the costs of labeling data in training and improving the efficiency of model training.

Additionally, the labeling process is also a process for determining a captured subject related to image definition. For example, if the captured subject is cells in the microscopic image, then an image may be labeled according to whether the cells in the images are clear. In this way, cells in one of two sample images in each determined sample image group must have a higher definition than cells in the other one of the two sample images in each determined sample image group, thus preparing data for learning the feature related to image definition in the multi-scale feature by a model. Certainly, as required in actual scenarios, the labeling may be performed according to the standard of whether other captured objects are clear, which is not limited in this embodiment of the present disclosure.

In step S304, each sample image group is inputted as training data into a relative definition scoring model pre-established. The relative definition scoring model is configured to determine a relative definition score of each sample image according to multi-scale features of the two sample images in each sample image group.

For example, the relative definition scoring model may be a multi-layer perceptron composed of two fully connected layers. The first fully connected layer is connected to rectified linear unit (Relu) activation, and the second fully connected layer outputs a score. The model may also be configured to be a twin network structure, and the network branches are respectively configured to score relative definition of a sample image having higher definition and a sample image having lower definition which are in each sample image group.

In step S305, the model is trained according to the relative definition scores and the relative definition relationship of the two sample images in each sample image group by using a contrastive loss function.

The relative definition scoring model is trained in a contrastive training manner. For example, during the training, for any sample image pair including image A and image B, where image A has greater definition than image B, the model predicts relative definition scores of image A and image B according to multi-scale features of image A and image B, respectively, by using two network branches described above, and the relative definition scores are respectively recorded as $p_n$ and $q_n$. Then, the model is trained by using the contrastive loss function, where the contrastive loss function may be expressed as the following formula:

$$L = \frac{1}{N} \sum_{n=1}^{N} \max(\text{margin} - (p_n - q_n), 0)^2$$

N denotes the total number of sample data groups. margin denotes a hyperparameter and may be set to a smaller value such as 0.1, which specifically depends on a trained data set. It can be seen from this that the loss function encourages that $p_n \geq q_n + \text{margin}$; then, a relative definition scoring network can be trained and obtained through the loss function, and a score outputted by the network reflects the relative definition relationship between image A and image B. Moreover, the model can continuously optimize a weight of a feature extraction network part related to image definition through the training, so that the trained model has the ability to identify a definition related feature from a multi-scale feature and can evaluate whether the captured subject is clear.

In prediction, for any group of multiple microscopic images in the same field of view, a multi-scale feature of each image is extracted by using a multi-scale pyramid Laplace operator; then, relative definition of each image is scored according to the multi-scale feature by using the trained relative scoring model; finally, definition sequencing may be performed on the multiple microscopic images based on scoring results, which may be used for guiding the subsequent analysis and processing of microscopic images.

According to the technical solution in this embodiment of the present disclosure, only at least one clear image, rather than each sample pair, needs to be labeled in a sample image set captured at different focal lengths in the same field of view, thereby reducing the costs of labeling data in training and improving the efficiency of model training. Moreover, a model is trained in a contrastive training manner, which helps to achieve the training purpose of learning a feature related to image definition in a multi-scale feature, so that the trained model has the ability to identify a feature related to image definition from a multi-scale feature, and can evaluate whether a captured subject is clear, thereby improving the evaluation accuracy for image relative definition.

Figure 4:
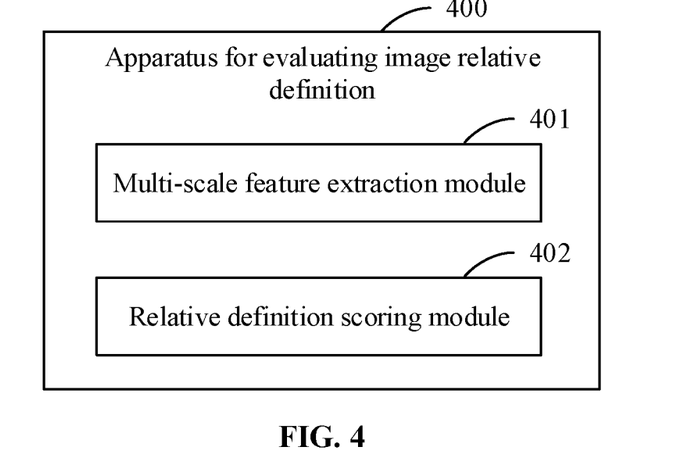
FIG. 4 is a structure diagram of an apparatus for evaluating image relative definition according to an embodiment of the present disclosure.

FIG. 4 is a structure diagram of an apparatus for evaluating image relative definition according to an embodiment of the present disclosure. This embodiment is applicable to the case of scoring relative definition of each image in an image set, for example, scoring relative definition of microscopic images captured at different focal lengths in the same field of view, which relates to technologies such as computer vision, deep learning and intelligent medical. The apparatus can implement the method for evaluating image relative definition described in any embodiment of the present disclosure. As shown in FIG. 4, the apparatus specifically includes a multi-scale feature extraction module 401 and a relative definition scoring module 402.

The multi-scale feature extraction module 401 is configured to extract a multi-scale feature of each image in an image set. The multi-scale feature is used for representing definition features of objects having different sizes in the image.

The relative definition scoring module 402 is configured to score relative definition of each image in the image set according to the multi-scale feature by using a relative definition scoring model pre-trained.

The purpose for training the relative definition scoring module is to learn a feature related to image definition in the multi-scale feature.

The multi-scale feature extraction module 401 may be configured to: extract the multi-scale feature of each image in the image set by using a pyramid Laplace operator. The pyramid Laplace operator is used for respectively extracting features by using the Laplace operator at multiple image scales and merging the extracted features.

The multi-scale feature extraction module 401 may include an image scaling unit, a feature extraction unit and a feature merging unit.

The image scaling unit is configured to scale each image in the image set according to at least two multiple values to obtain at least two scaled images corresponding to each image.

The feature extraction unit is configured to extract a multi-scale feature of each scaled image by using the pyramid Laplace operator.

The feature merging unit is configured to merge the multi-scale features of the at least two scaled images corresponding to each image to obtain the multi-scale feature of each image.

The relative definition scoring model may be trained in a comparative training manner.

The images in the image set may be captured by a capturing device at different focal lengths in the same field of view.

The apparatus further may include a relative definition scoring model training module. The relative definition scoring model training module includes a sequencing unit, a labeling determination unit, an image group determination unit, an input unit and a training unit.

The sequencing unit is configured to sequence sample images in a sample image set according to magnitudes of capturing focal lengths.

The labeling determination unit is configured to determine, in the sample image set after the sequencing, at least one clear sample image labeled.

The image group determination unit is configured to determine multiple paired sample image groups and a relative definition relationship between two sample images in each sample image group according to the at least one clear sample image and the sequencing of the sample images in the sample image set.

The input unit is configured to input each sample image group as training data into the relative definition scoring model pre-established. The relative definition scoring model is configured to determine a relative definition score of each sample image according to multi-scale features of the two sample images in each sample image group.

The training unit is configured to train the relative definition scoring model according to the relative definition scores and the relative definition relationship of the two sample images in each sample image group by using a contrast loss function.

The relative definition scoring model may be a twin network structure, and the network branches are respectively configured to score relative definition of a sample image having higher definition and a sample image having lower definition which are in each sample image group.

The apparatus may further include a sequencing module.

The sequencing module is configured to perform definition sequencing on the images in the image set based on the scoring results of the relative definition scoring module.

The images may be microscopic images.

The evaluation apparatus 400 for image relative definition provided in this embodiment of the present disclosure can execute the method for evaluating image relative definition provided in any embodiment of the present disclosure, and has corresponding functional modules and beneficial effects for executing the method. For an exhaustive description of this embodiment, reference may be made to the description of any method embodiment of the present disclosure.

According to embodiments of the present disclosure, the present disclosure further provides an electronic device and a readable storage medium.

Figure 5:
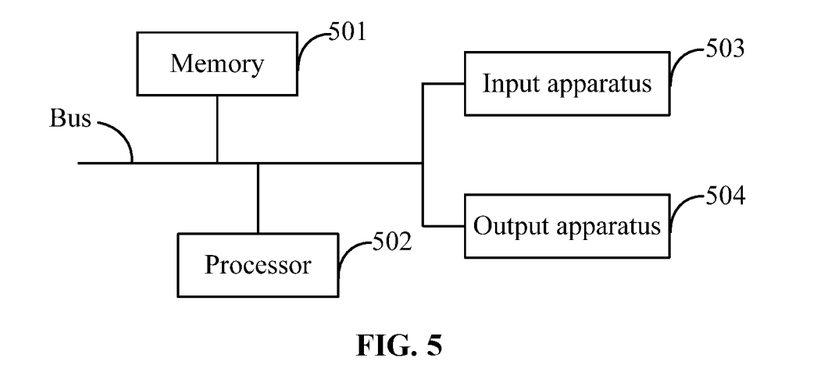
FIG. 5 is a block diagram of an electronic device for performing a method for evaluating image relative definition according to an embodiment of the present disclosure.

As shown in FIG. 5, FIG. 5 is a block diagram of an electronic device for performing a method for evaluating image relative definition according to an embodiment of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are merely illustrative and are not intended to limit the implementation of the present disclosure as described and/or claimed herein.

As shown in FIG. 5, the electronic device includes one or more processors 501, a memory 502, and interfaces for connecting various components, including a high-speed interface and a low-speed interface. The various components are interconnected to each other by different buses and may be mounted on a common mainboard or in other manners as desired. The processor may process instructions executed in the electronic device, including instructions stored in or on the memory to make graphic information of a GUI displayed on an external input/output apparatus (for example, a display apparatus coupled to an interface). In other implementation, if required, multiple processors and/or multiple buses may be used with multiple memories. Similarly, multiple electronic devices may be connected, each providing some necessary operations (and, for example, serving as a server array, a group of blade servers or a multi-processor system). The electronic device including one processor 501 is used as an example in FIG. 5.

The memory 502 is a non-transitory computer-readable storage medium provided in the present disclosure. The memory stores instructions executable by at least one processor to cause the at least one processor to perform the method for evaluating image relative definition provided in the present disclosure. The non-transitory computer-readable storage medium of the present disclosure stores computer instructions for causing a computer to perform the method for evaluating image relative definition provided in the present disclosure.

As a non-transient computer-readable storage medium, the memory 502 may be configured to store non-transient software programs, non-transient computer executable programs and modules, for example, program instructions/modules corresponding to the method for evaluating image relative definition in the embodiments of the present disclosure (for example, the multi-scale extraction module 401 and the relative definition scoring module 402 shown in FIG. 4). The processor 501 executes non-transitory software programs, instructions and modules stored in the memory 502 to execute the various function applications and data processing of a server, that is, perform the method for evaluating image relative definition provided in the method embodiments described above.

The memory 502 may include a program storage region and a data storage region. The program storage region may store an operating system and an application program required by at least one function. The data storage region may store data created based on the use of the electronic device for performing the method for evaluating image relative definition. Additionally, the memory 502 may include a high-speed random-access memory and a non-transient memory, for example, at least one disk memory, a flash memory or another non-transient solid-state memory. In some embodiments, the memory 502 may include memories disposed remote from the processor 501, and these remote memories may be connected, through a network, to the electronic device for performing the method for evaluating image relative definition. Examples of the network described above include, but are not limited to, the Internet, an intranet, a local area network, a mobile communication network and a combination thereof.

The electronic device for performing the method for evaluating image relative definition of the embodiments of the present disclosure may further include an input apparatus 503 and an output apparatus 504. The processor 501, the memory 502, the input apparatus 503 and the output apparatus 504 may be connected via a bus or in other manners. A connection via a bus is used as an example in FIG. 5.

The input apparatus 503 may receive inputted number or character information and generate key signal input related to user settings and function control of the electronic device for performing the method for evaluating image relative definition. The input apparatus 503 may be, for example, a touchscreen, a keypad, a mouse, a trackpad, a touchpad, a pointing stick, one or more mouse buttons, a trackball or a joystick. The output apparatus 504 may include a display device, an auxiliary lighting apparatus (for example, an LED), a haptic feedback apparatus (for example, a vibration motor) or the like. The display device may include, but is not limited to, a liquid-crystal display (LCD), a light-emitting diode (LED) display or a plasma display. In some implementations, the display device may be a touchscreen.

The various implementations of the systems and techniques described herein may be implemented in digital electronic circuitry, integrated circuitry, an application-specific integrated circuit (ASIC), computer hardware, firmware, software and/or a combination thereof. The various implementations may be implemented in one or more computer programs. The one or more computer programs are executable and/or interpretable on a programmable system including at least one programmable processor. The programmable processor may be a dedicated or general-purpose programmable processor for receiving data and instructions from a memory system, at least one input apparatus and at least one output apparatus and transmitting the data and instructions to the memory system, the at least one input apparatus and the at least one output apparatus.

These computing programs (also referred to as programs, software, software applications or codes) include machine instructions of a programmable processor. Moreover, these computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

To provide interaction with a user, the systems and techniques described herein may be implemented on a computer. The computer has a display apparatus (for example, a cathode-ray tube (CRT) or liquid-crystal display (LCD) monitor) for displaying information to the user; and a keyboard and a pointing apparatus (for example, a mouse or a trackball) through which the user can provide input to the computer. Other types of apparatuses may be used for providing interaction with the user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), the Internet and a blockchain network.

A computer system may include a client and a server. The client and the server are generally remote from each other and typically interact through a communication network. The relationship between the client and the server arises by virtue of computer programs running on the respective computers and having a client-server relationship to each other. The server may be a cloud server, also referred to as a cloud computing server or a cloud host, which is a host product in a cloud computing service system, so as to solve the defects of difficult management and weak traffic scalability in traditional physical hosts and VPS services.

According to the technical solution of this embodiment of the present disclosure, definition features of objects having different sizes in an image are effectively distinguished by extracting a multi-scale feature by using a pyramid Laplace operator, a model learns a feature related to image definition in a multi-scale feature through training, and then, relative definition is scored by using the trained model. This can improve the evaluation accuracy for image relative definition. Moreover, only at least one clear image, rather than each sample pair, needs to be labeled in a sample image set captured at different focal lengths in the same field of view, thereby reducing the costs of labeling data in training and improving the efficiency of model training.

It is to be understood that various forms of the flows described above may be used, with steps reordered, added or removed. For example, the various steps described in the present disclosure may be executed in parallel, in sequence or in a different order as long as the desired result of the technical solution disclosed in the present disclosure is achieved, which is not limited herein.

The scope of the present disclosure is not limited to the specific implementations describe above. It is to be understood by those having ordinary skill in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A method for evaluating image relative definition, comprising:
   extracting a multi-scale feature of each image in an image set, wherein the multi-scale feature is used for representing definition features of objects having different sizes in the each image; and
   scoring relative definition of the each image in the image set according to the multi-scale feature by using a pre-trained relative definition scoring model,
   wherein the pre-trained relative definition scoring model is obtained by training a pre-established relative definition scoring model, and the pre-trained relative definition scoring model is used to learn a feature related to image definition in a multi-scale feature;
   wherein extracting the multi-scale feature of each image in the image set comprises:
   extracting the multi-scale feature of each image in the image set by using a pyramid Laplace operator, wherein the pyramid Laplace operator is used for respectively extracting features by using the pyramid Laplace operator at a plurality of image scales and merging the extracted features; and
   wherein extracting the multi-scale feature of each image in the image set by using the pyramid Laplace operator comprises:
   scaling each image in the image set according to at least two multiple values to obtain at least two scaled images corresponding to the each image;
   extracting a multi-scale feature of each of the at least two scaled images by using the pyramid Laplace operator; and
   merging the multi-scale features of the at least two scaled images corresponding to the each image to obtain the multi-scale feature of the each image.

2. The method of claim 1, wherein the pre-established relative definition scoring model is trained in a contrastive training manner.

3. The method of claim 1, wherein the images in the image set are captured by a capturing device at different focal lengths in a same field of view.

4. The method of claim 3, wherein a process for training the pre-established relative definition scoring model comprises:

sequencing sample images in a sample image set according to magnitudes of capturing focal lengths;
determining, in the sample image set after the sequencing, at least one clear sample image labeled;
determining a plurality of paired sample image groups and a relative definition relationship between two sample images in each of the plurality of sample image groups according to the at least one clear sample image and the sequencing of the sample images in the sample image set;
inputting each of the plurality of sample image groups as training data into the pre-established relative definition scoring model, wherein the pre-established relative definition scoring model is configured to determine a relative definition score of each of the two sample images according to multi-scale features of the two sample images in the each of the plurality of sample image groups; and
training the pre-established relative definition scoring model according to the relative definition relationship and the relative definition scores of the two sample images in the each of the plurality of sample image groups by using a contrastive loss function.

5. The method of claim 4, wherein the pre-established relative definition scoring model is a twin network structure, network branches are configured to score relative definition of a sample image having higher definition and a sample image having lower definition which are in the each of the plurality of sample image groups.

6. The method of claim 1, further comprising:
performing definition sequencing on the images in the image set based on scoring results.

7. The method of claim 1, wherein the images are microscopic images.

8. An apparatus for evaluating image relative definition, comprising:
a multi-scale feature extraction module, which is configured to extract a multi-scale feature of each image in an image set, wherein the multi-scale feature is used for representing definition features of objects having different sizes in the each image; and
a relative definition scoring module, which is configured to score relative definition of the each image in the image set according to the multi-scale feature by using a pre-trained relative definition scoring model,
wherein the pre-trained relative definition scoring model is obtained by training a pre-established relative definition scoring model, and the pre-trained relative definition scoring model is used to learn a feature related to image definition in the multi-scale feature;
wherein the multi-scale feature extraction module is configured to:
extract the multi-scale feature of each image in the image set by using a pyramid Laplace operator, wherein the pyramid Laplace operator is used for extracting features by respectively using the pyramid Laplace operator at a plurality of image scales and merging the extracted features; and
wherein the multi-scale feature extraction module comprises:
an image scaling unit, which is configured to scale each image in the image set according to at least two multiple values to obtain at least two scaled images corresponding to the each image;
a feature extraction unit, which is configured to extract a multi-scale feature of each of the at least two scaled images by using the pyramid Laplace operator; and
a feature merging unit, which is configured to merge the multi-scale features of the at least two scaled images corresponding to the each image to obtain the multi-scale feature of the each image.

9. The apparatus of claim 8, wherein the pre-established relative definition scoring model is trained in a contrastive training manner.

10. The apparatus of claim 8, wherein images in the image set are captured by a capturing device at different focal lengths in a same field of view.

11. The apparatus of claim 10, further comprising: a relative definition scoring model training module, which comprises:
a sequencing unit, which is configured to sequence sample images in a sample image set according to magnitudes of capturing focal lengths;
a labeling determination unit, which is configured to determine, in the sample image set after the sequencing, at least one clear sample image labeled;
an image group determination unit, which is configured to determine a plurality of paired sample image groups and a relative definition relationship between two sample images in each of the plurality of sample image groups according to the at least one clear sample image and the sequencing of the sample images in the sample image set;
an input unit, which is configured to input each of the plurality of sample image groups as training data into pre-established relative definition scoring model, wherein the pre-established relative definition scoring model is configured to determine a relative definition score of each of the two sample image according to multi-scale features of the two sample images in the each of the plurality of sample image groups; and
a training unit, which is configured to train the pre-established relative definition scoring model according to the relative definition relationship and the relative definition scores of the two sample images in the each of the plurality of sample image groups by using a contrastive loss function.

12. The apparatus of claim 11, wherein the pre-established relative definition scoring model is a twin network structure, network branches are respectively configured to score relative definition of a sample image having higher definition and a sample image having lower definition which are in the each of the plurality of sample image groups.

13. The apparatus of claim 8, further comprising:
a sequencing module, which is configured to perform definition sequencing on the images in the image set based on scoring results of the relative definition scoring module.

14. The apparatus of claim 8, wherein the images are microscopic images.

15. An electronic device, comprising:
at least one processor; and
a memory, which is communicatively connected to the at least one processor,
wherein the memory stores instructions executable by the at least one processor, the instructions are executed by the at least one processor to enable the at least one processor to execute the method for evaluating image relative definition of claim 1.

16. A non-transitory computer-readable storage medium, storing computer instructions, wherein the computer instructions are configured to cause a computer to perform the method for evaluating image relative definition of claim 1.

\* \* \* \* \*